United States Patent
Jayaraman

(10) Patent No.: US 8,683,188 B2
(45) Date of Patent: Mar. 25, 2014

(54) REBOOT CONTROLLER TO PREVENT UNAUTHORIZED REBOOT

(75) Inventor: Arunachalam Jayaraman, Choolaimedu (IN)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 12/897,953

(22) Filed: Oct. 5, 2010

(65) Prior Publication Data

US 2012/0084560 A1   Apr. 5, 2012

(51) Int. Cl.
*H04L 29/06* (2006.01)

(52) U.S. Cl.
USPC ............... 713/2; 713/182; 713/184; 713/185; 726/4; 726/21

(58) Field of Classification Search
USPC ............... 713/2, 182–185; 726/4, 21
See application file for complete search history.

(56) References Cited

U.S. PATENT DOCUMENTS

| | | | |
|---|---|---|---|
| 7,007,300 B1 | 2/2006 | Weber et al. | |
| 7,360,073 B1 | 4/2008 | Billstrom et al. | |
| 7,657,732 B2 | 2/2010 | Han | |
| 2005/0257041 A1 | 11/2005 | Wallenstein et al. | |
| 2007/0214348 A1* | 9/2007 | Danielsen | 713/2 |
| 2008/0046982 A1 | 2/2008 | Parkinson | |
| 2008/0172556 A1* | 7/2008 | Ishikawa et al. | 713/2 |
| 2009/0210689 A1* | 8/2009 | Harmer | 713/2 |
| 2009/0327684 A1 | 12/2009 | Zimmer et al. | |
| 2010/0174921 A1* | 7/2010 | Abzarian et al. | 713/193 |

OTHER PUBLICATIONS

"Changing the Authentication Method From Local Operating System to LDAP Federated Repositories", IBM Corporation [online], [retrieved on Jun. 5, 2010], Retrieved from the Internet: <URL:http://publib.boulder.ibm.com/infocenter/tivihelp/v4r1/index.jsp?topic=/com.ibm.tpc_V411.doc/fqz0_t_config_ldap_active_directory.html>.

"Changing the Authentication Method From Local Operating System to LDAP Federated Repositories", IBM Corporation Jun. 5, 2010.

* cited by examiner

*Primary Examiner* — Justin T Darrow
(74) *Attorney, Agent, or Firm* — Law Offices of Ira D. Blecker, P.C.

(57) ABSTRACT

A method, computer program product and system of preventing the unauthorized rebooting of a server having a change record, reboot password and valid reboot key. The method includes authenticating that rebooting is authorized by the change record; responsive to entering a reboot password, authenticating that a valid reboot password has been entered; and responsive to entering a reboot key, authenticating by a computer processor that a valid reboot key has been entered.

16 Claims, 3 Drawing Sheets

REBOOT CONTROLLER TO PREVENT UNAUTHORIZED REBOOT

BACKGROUND

The present invention relates to the rebooting of server computers (i.e., servers) and, more particularly, relates to the control of the rebooting of server computers in multi-server computer organizations. (i.e datacenters)

In a datacenter, there are often upgrades, patches and configuration changes. Each of these upgrades, patches and configuration changes may require a reboot (i.e., restarting) of one or more servers It may happen that for one or more reasons, the wrong server is rebooted. The wrong reboot of a server is an unexpected event and can cause service disruptions to the server owner and ultimately to the customers, who host the applications on the server.

Accordingly, the wrong reboot of a server should be avoided if possible.

BRIEF SUMMARY

The various advantages and purposes of the exemplary embodiments as described above and hereafter are achieved by providing, according to a first aspect of the exemplary embodiments, a method of preventing the unauthorized rebooting of a server having a change record, reboot password and valid reboot key. The method includes authenticating that rebooting is authorized by the change record; responsive to entering a reboot password, authenticating that a valid reboot password has been entered; and responsive to entering a reboot key, authenticating by a computer processor that a valid reboot key has been entered.

According to a second aspect of the exemplary embodiments, there is provided a method of preventing the unauthorized rebooting of a server having a reboot password. The method includes generating a change record authorizing the rebooting of a server; authenticating that rebooting of the server is authorized by the change record; responsive to entering a password into the server, authenticating that the password entered corresponds to the reboot password; generating by a computer processor a valid reboot key to authorize the rebooting of the server; and responsive to entering a reboot key into the server, authenticating by a computer processor that the reboot key entered corresponds to the valid reboot key.

Other aspects of the exemplary embodiments include computer program products and systems for preventing the unauthorized rebooting of a server having a reboot password.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

The present invention has particular applicability to servers. A server is a computer, or series of computers, that link other computers or electronic devices together. The server may be a mainframe, minicomputer or microcomputer as long as it is providing the function of linking other computers or electronic devices together.

Figure 1:
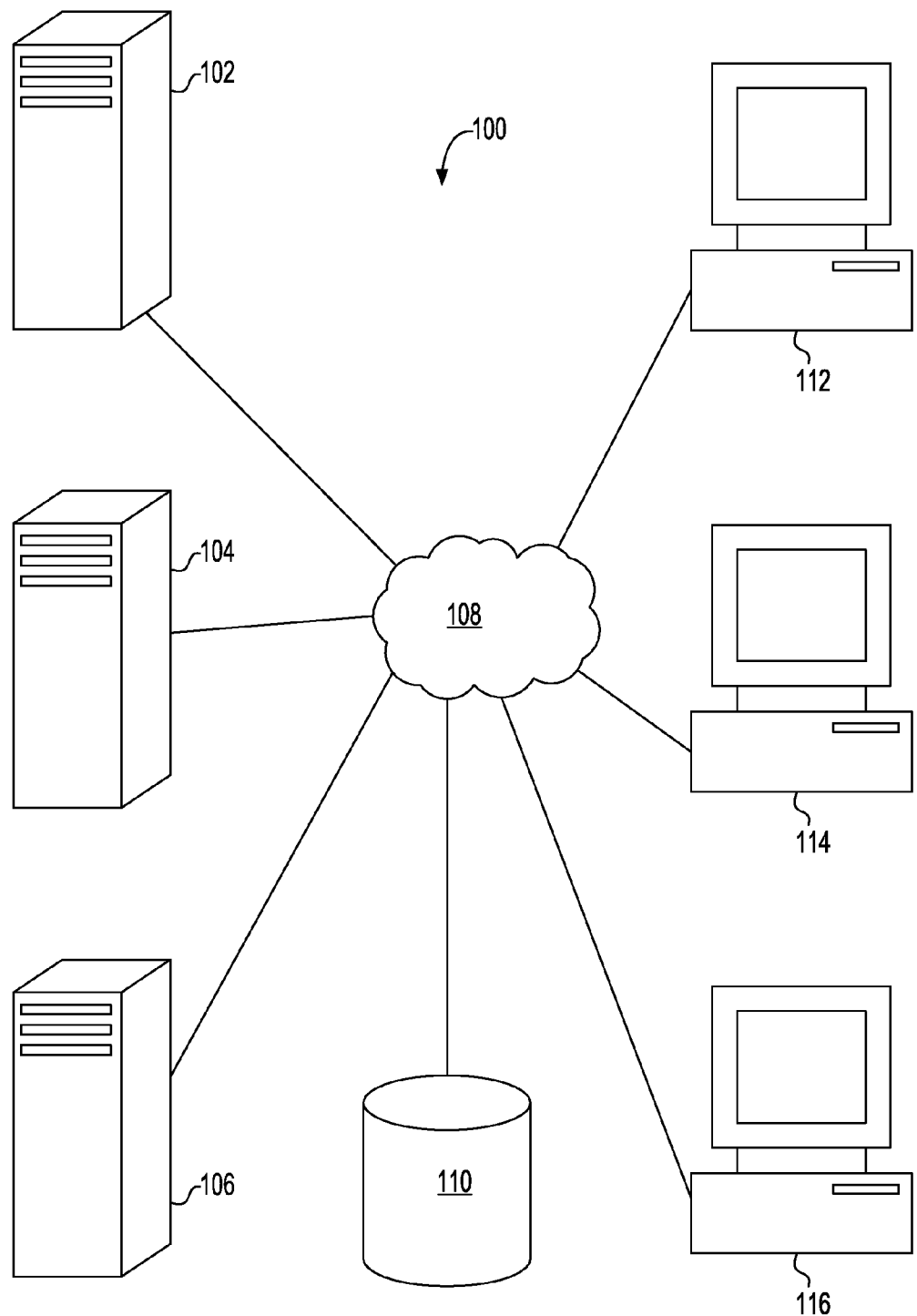
FIG. 1 illustrates a network of computers in which aspects of the exemplary embodiments may be implemented.

FIG. 1 is an illustration of a network of computers in which aspects of the exemplary embodiments may be implemented. Network computing system 100 is a network of computers in which exemplary embodiments of the present invention may be implemented. The computers may include microprocessor means, random access memory (RAM), read-only memory (ROM) and other components. Resident in the computers, or peripheral to them, may be a storage device of some type such as a hard disk drive, floppy disk drive, CD-ROM drive, tape drive or other storage device. There may also be a separate storage unit 110. Network computing system 100 contains network 108, which is the medium used to provide communication links between various devices and computers connected within network computing system 100. Network 108 may include connections, such as wire, wireless communication links, or fiber optic cables.

In the depicted illustration shown in FIG. 1, servers 102, 104, 106 connect to network 108 along with storage unit 110. In addition, nodes (may also be called clients) 112, 114, 116 connect to network 108. The nodes 112, 114, 116 may be, for example, personal computers or network computers. In the depicted example, servers 102, 104, 106 provide data, such as boot files, operating system images, and applications to nodes 112, 114, 116. Network computing system 100 may include additional servers, clients, and other numerous devices not shown and these additional servers, clients and other numerous devices are considered to be within the scope of the present invention.

In the depicted illustration shown in FIG. 1, network computing system 100 may be the Internet with network 108 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems. Network computing system 100 also may be implemented as a number of different types of networks, such as for example, an intranet, a local area network (LAN), or a wide area network (WAN). FIG. 1 is intended as an example, and not as an architectural limitation, for different embodiments of the present invention.

In practice, servers 102, 104, 106 are continuously updated with upgrades, patches and configuration changes (hereafter collectively referred to as updates). The updates may occur every day. If the updates require a reboot of the server, it would be desirable to make sure that the correct server is rebooted after being updated. The wrong server may be rebooted through human error, unauthorized access or other causes. If the wrong server is rebooted unexpectedly, service disruptions can result.

It would be desirable to avoid the wrong rebooting of a server.

Accordingly, the present inventor has proposed a reboot controller to prevent unauthorized reboot of a server.

Figure 2:
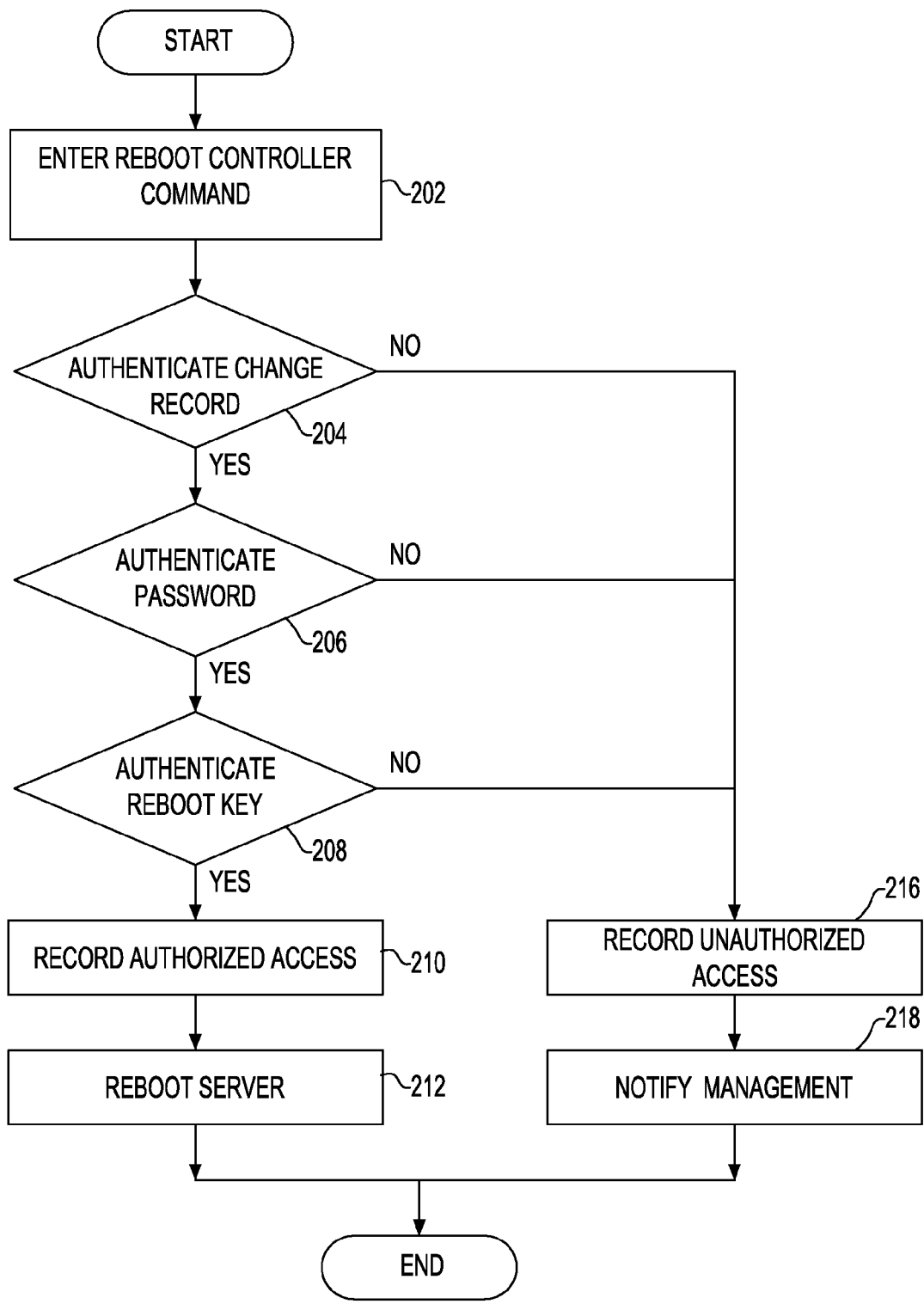
FIG. 2 is a flow chart of an exemplary embodiment.

Referring to FIG. 2, an exemplary embodiment will be discussed. When a server needs to be rebooted, an authorized person logs in to the server to be rebooted and enters a reboot controller command on the server, box 202. For purposes of the present discussion, the authorized person is a system administrator but could be a duty manager, team lead or other Information Technology (IT) professional.

It should be understood that since the servers 102, 104, 106 and nodes 112, 114, 116 are all networked thorough network 108, the system administrator need not sit at the server to be rebooted to enter the reboot controller command. For example, if server 102 is to be rebooted, the system administrator may sit at server 102 or nodes 112, 114, 116 or even one of the other servers 104, 106, which are networked to server 102 through network 108, to perform the reboot function.

In order for servers 102, 104, 106 to be updated, a change record is generated by a person who is authorized to make changes to the servers 102, 104, 106. The change record includes various details of what changes are to be made to the servers 102, 104, 106. These changes may include, but not be limited to:

Date and time of the change
Implementer of the change
implementation plan
Time required to implement the change
Approvals
Fallback plan in case changes fail
List of affected Servers
Time required to do fallback
Is reboot required to complete the change In the exemplary embodiments, there is a change management tool that is a repository of all of the change records. The change management tool may also be called a Service Delivery Management (SDM) tool. There are a number of SDM tools commercially available such as Maximo (IBM Corporation), Remedy (Remedy Corporation) and ServiceCenter (Hewlett-Packard).

In the exemplary embodiments, the change management tool may also be integrated with a Configuration Management Database (CMDB) which is a repository of information of the hardware and software components of the servers 102, 104, 106. Alternatively, the change management tool may be integrated with a Configuration Management Integrator (CMI) which has similar functions as the CMDB.

There are three levels of authentication that must occur before any of the servers 102, 104, 106 may be rebooted. In the first level of authentication (box 204), the change record must be authenticated, in the second level of authentication (box 206), a password must be authenticated and in the third level of authentication (box 208), a reboot key is authenticated. All of these three levels of authentication must pass before the rebooting of the server 102, 104 or 106 can occur. If any of the three levels of authentication fail, rebooting of the server 102, 104 or 106 cannot occur.

Referring to the first level of authentication, box 204, the system administrator must review and verify each requirement of the change record with respect to the server to be rebooted. If the system administrator verifies each requirement of the change record with respect to the server to be rebooted, the change record is authenticated and the process proceeds on the "yes" path to the next level of authentication. Otherwise, the process proceeds on the "no" path.

In the next level of authentication, box 206, the system administrator must enter the correct password for the server to be rebooted 102, 104 or 106. In one exemplary embodiment, the password is the root password. The root password is assigned to a system administrator (or higher level person) which authorizes the system administrator to make changes to the servers 102, 104, 106 or the network 108. Users of the network computing system 100 have a lower level password which typically enables the users a much lower level of access to the network computing system 100. If the correct password is entered into the server to be rebooted 102, 104 or 106, the second level of authentication passes and the process proceeds on the "yes" path to the next level of authentication. If an incorrect password is entered, the process proceeds on the "no" path.

In the third level of authentication, box 208, the system administrator must enter the correct reboot key. The procedure for generating the reboot key will be discussed below. If the correct reboot key is entered, the third lever of authentication passes and the process proceeds on the "yes" path to record authorized access details along with the reboot key, date and time, box 210. Thereafter, the server 102, 104 or 106 is rebooted, box 212, and then the reboot controller process ends.

If any of the levels of authentication fail such that the process proceeds down the "no" paths, unauthorized access along with date and time may be recorded, box 216. Authorized persons, such as the duty manager or on-call person may also be notified of the unauthorized reboot attempt, box 218.

Figure 3:
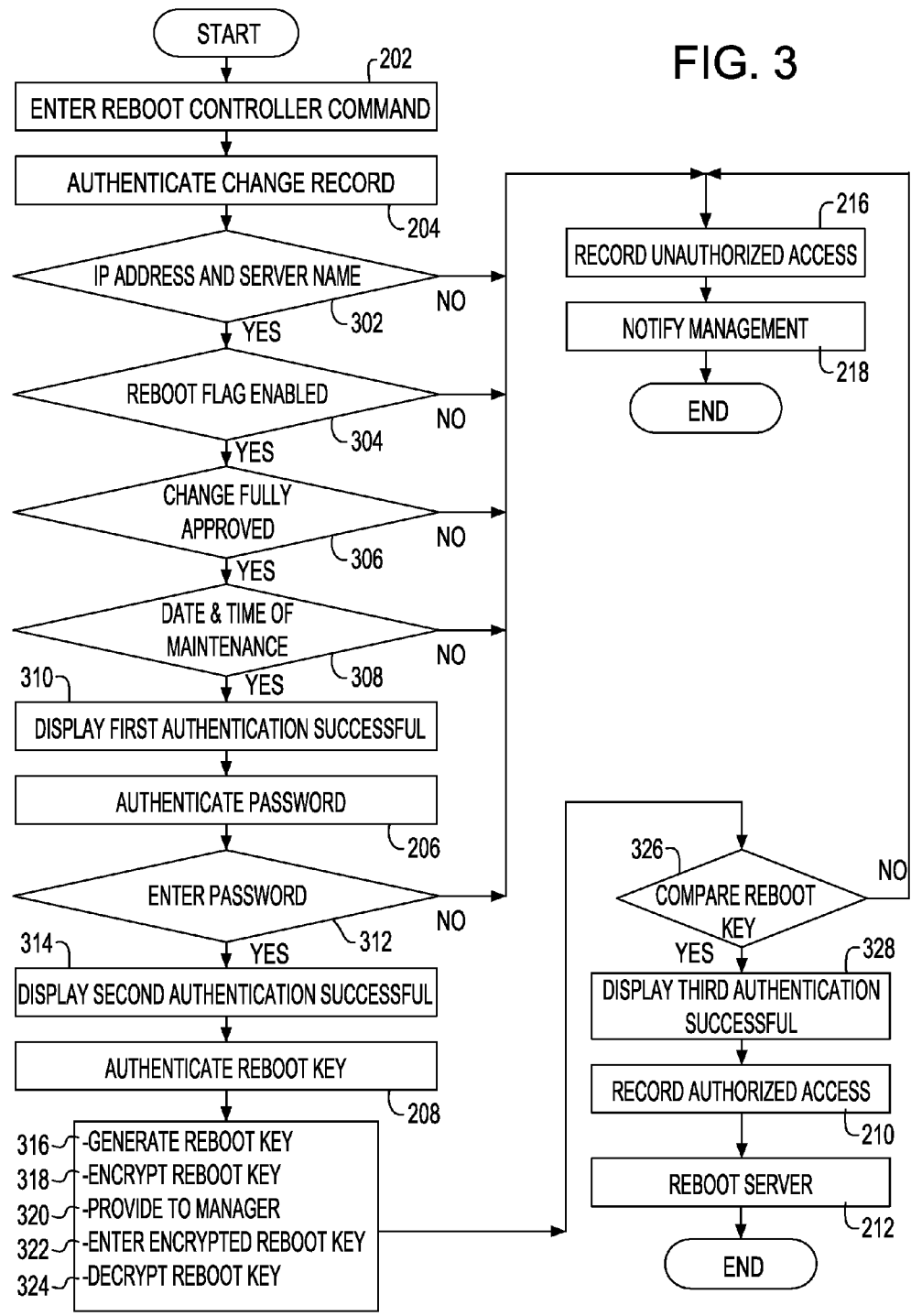
FIG. 3 is a more detailed flow chart of the exemplary embodiment of FIG. 2.

Referring now to FIG. 3, the reboot controller process will be described in more detail. In the first level of authentication, box 204, the system administrator reviews the change record and compares the requirements in the change record with the particulars of the server to be rebooted 102, 104 or 106. The requirements of the change record may include the IP address and name of the server to be rebooted (box 302), the reboot flag is enabled as "yes" (box 304), the change record has been fully approved (box 306) and the date and time of update matches the time of the server (box 308). Thus, if the IP address and name of the server to be rebooted matches the IP address and name of the server in the change record, if the reboot flag in the change record is enabled as "yes", if the change record is approved and if the date and time of the update matches the date and time of the server to be rebooted, then all of the requirements have been matched, the first level of authentication passes and "First Level of Authentication Successful" (or a similar message) may be displayed on a monitor, box 310. The process then proceeds to the second level of authentication, box 206.

If any of the requirements are not matched, the process takes the "no" path which will cause the reboot to not take place.

As described above in the first level of authentication, each of the requirements in the change record must be verified. The system administrator may simply note that there is a match for each of the requirements. In an exemplary embodiment, the server may have a series of boxes that the system administrator can tick off to record that there is a match for each of the requirements in the change record. In a further exemplary embodiment, the change record may be compared to the particulars of the server to be rebooted by a suitable hardware or software means to fully automate the authentication.

In the second level of authentication, box 206, the system administrator enters the server password, box 312. In an exemplary embodiment, the password is the root password. The password entered is compared with the correct password resident in the server to be rebooted 102, 104 or 106 and if the password entered is correct, "Second Level of Authentication Successful" (or a similar message) may be displayed on a monitor, box 314.

If the password entered is incorrect, the "no" path is taken which will cause the reboot to not take place.

In the third level of authentication, box 208, a reboot key must be authenticated. The reboot key will now be described. A reboot key is generated by the server to be rebooted, box 316. The reboot key may be, for purposes of illustration and not limitation, generated by a random number generator in each of the servers 102, 104, 106, which generates a random number on each server at a predetermined time of day. A random letter generator may also be used. When the reboot key is generated by the server to be rebooted, it is also distributed to all of the nodes 112, 114, 116, and possibly to other of the servers 102, 104, 106. The reboot key may be distributed by secured network file sharing or other secure method.

Thereafter, in box 318, the reboot key is encrypted by known technology and provided, usually by email, to an authorized manager or perhaps even the system administrator. If the reboot key is sent to the manager, the manager will forward it to the system administrator.

The system administrator, having received the encrypted reboot key, enters the encrypted reboot key, box 322, in the server to be rebooted or one of the nodes 112, 114, 116. It is envisioned that the servers 102, 104, 106 may be remote from the system administrator who may have one of the nodes 112, 114, 116 at his/her desk, in which case the system administrator may simply enter the encrypted reboot key at the node 112, 114, 116 that is at his/her desk. In an exemplary embodiment, the system administrator may also enter the reboot key at a server different from the one that is to be rebooted since all of the servers 102, 104, 106 are networked.

After the system administrator enters the encrypted reboot key, the reboot key is decrypted by known technology, box 324.

The decrypted reboot key is then compared, box 326, with the reboot key distributed by the server that is to be rebooted and if there is a match, the third level of authentication is successful. If the match is successful, "Third Level of Authentication Successful" (or similar message) is displayed on a monitor, box 328.

If the reboot key is incorrect, the "no" path is taken which will cause the reboot to not take place.

If all levels of authentication have successfully been passed, authorized access details along with reboot key, date and time may be recorded, box 210, and the server may be rebooted, box 212. The reboot controller process then ends.

If any of the "no" paths have been taken as described above, unauthorized access details along with date and time may be recorded, box 216, and then appropriate personnel may be notified of the unauthorized reboot attempt, box 218.

It can be seen that with the three levels of authentication required for server reboot, unauthorized reboots can be effectively prevented.

As will be appreciated by one skilled in the art, aspects of the exemplary embodiments may be embodied as a system, method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of preventing the unauthorized rebooting of a server comprising a computer processor, the server having a reboot password comprising:
    updating a server such that rebooting of the server is required;
    performing a rebooting routine prior to rebooting of the server, the rebooting routine comprising:
        generating a change record authorizing the rebooting of the server;
        authenticating that rebooting of the server is authorized by the change record;
        responsive to entering a password into the server, authenticating that the password entered corresponds to the reboot password;
        generating by the server a valid reboot key to authorize the rebooting of the server; and
        responsive to entering a reboot key into the server, authenticating by a computer processor that the reboot key entered corresponds to the valid reboot key;
    wherein after authenticating that rebooting of the server is authorized by the change record, after authenticating that the password entered corresponds to the reboot password, and after authenticating by a computer processor that the reboot key entered corresponds to the valid reboot key, further comprising rebooting the server.

2. The method of claim 1 wherein the change record has the following requirements: server name and IP address of the server to be rebooted, a reboot flag checked "yes", authorization for the rebooting, and date and time of rebooting.

3. The method of claim 2 wherein authenticating that rebooting is authorized by the change record comprises authenticating that each of the requirements in the change record have been met.

4. The method of claim 1 wherein the reboot password is a root password.

5. The method of claim 1 wherein generating by a computer processor a valid reboot key comprises:
    generating a reboot key by the server;
    encrypting the server-generated reboot key;
    providing the encrypted server-generated reboot key to an authorized person; and
wherein authenticating by a computer processor the reboot key comprises:
    responsive to the authorized person entering the encrypted server-generated reboot key at the server, decrypting the encrypted server-generated reboot key;
    comparing the decrypted server-generated reboot key to the server-generated reboot key; and
    validating the reboot key when the server-generated reboot key and decrypted server-generated reboot key match.

6. The method of claim 1 wherein there are a plurality of nodes served by and in communication with the server, wherein generating by a computer processor a valid reboot key comprises:
    generating a reboot key by the server;
    providing the server-generated reboot key to the plurality of nodes;
    encrypting the server-generated reboot key;
    providing the encrypted server-generated reboot key to an authorized person; and
wherein authenticating by a computer processor the reboot key comprises:
    responsive to the authorized person entering the encrypted server-generated reboot key at the server or one of the plurality of nodes,
    decrypting the encrypted server-generated reboot key;
    comparing the decrypted server-generated reboot key to the server-generated reboot key at the server; and
    validating the decrypted server-generated reboot key when the server-generated reboot key at the server and decrypted server-generated reboot key match.

7. The method of claim 1 wherein there is at least one other server and a plurality of nodes in communication with the server, wherein responsive to entering a password into the server comprises entering a password directly into the server or into the at least one other server or any of the plurality of nodes which are in communication with the server.

8. The method of claim 1 wherein there is at least one other server and a plurality of nodes in communication with the server, wherein generating by a computer processor a valid reboot key comprises:
    generating a reboot key by the server;
    providing the server-generated reboot key to the at least one other server and the plurality of nodes;
    encrypting the server-generated reboot key;
    providing the encrypted server-generated reboot key to an authorized person; and
wherein authenticating by a computer processor the reboot key comprises:

responsive to the authorized person entering the encrypted server-generated reboot key at the server, the at least one other server or one of the plurality of nodes,
decrypting the encrypted server-generated reboot key;
comparing the decrypted server-generated reboot key to the server-generated reboot key at the server; and
validating the decrypted server-generated reboot key when the server-generated reboot key at the server and decrypted server-generated reboot key match.

9. The method of claim 1 wherein after each of the authenticating steps, further comprising displaying a message that authentication is successful.

10. The method of claim 1 wherein if rebooting of the server is not authorized by the change record, then rebooting of the server does not occur.

11. The method of claim 1 wherein if the password entered does not correspond to the reboot password, then rebooting of the server does not occur.

12. The method of claim 1 wherein if the reboot key entered does not correspond to the valid reboot key, then rebooting of the server does not occur.

13. A computer program product for preventing the unauthorized rebooting of a server comprising a computer processor, the server having a reboot password, the computer program product comprising:
a nontransitory computer readable storage medium having computer readable program code embodied therewith, the computer readable program code comprising:
computer readable program code configured to update a server such that rebooting of the server is required;
computer readable program code configured to perform a rebooting routine prior to rebooting of the server, the rebooting routine comprising:
computer readable program code configured to generate a change record authorizing the rebooting of a server;
computer readable program code configured to authenticate that rebooting of the server is authorized by the change record;
responsive to entering a password into the server, computer readable program code configured to authenticate that the password entered corresponds to the reboot password;
computer readable program code configured to generate a valid reboot key by the server to authorize the rebooting of the server; and
responsive to entering a reboot key into the server, computer readable program code configured to authenticate by a computer processor that the reboot key entered corresponds to the valid reboot key;
wherein after authenticating that rebooting of the server is authorized by the change record, after authenticating that the password entered corresponds to the reboot password, and after authenticating by a computer processor that the reboot key entered corresponds to the valid reboot key, further comprising computer readable program code to reboot the server.

14. A system including a server comprising a computer processor and a nontransitory computer readable storage medium, the nontransitory computer readable storage medium having program code stored thereon for preventing the unauthorized rebooting of the server having a reboot password, the program code comprising:
program code for updating the server such that rebooting of the server is required;
program code for performing a rebooting routine prior to rebooting of the server, the rebooting routine comprising:
program code for generating a change record authorizing the rebooting of the server;
program code for authenticating that rebooting of the server is authorized by the change record;
responsive to entering a password into the server, program code for authenticating that the password entered corresponds to the reboot password;
program code for generating a valid reboot key by the server to authorize the rebooting of the server; and
responsive to entering a reboot key into the server, program code for authenticating that the reboot key entered corresponds to the valid reboot key;
wherein after authenticating that rebooting of the server is authorized by the change record, after authenticating that the password entered corresponds to the reboot password, and after authenticating that the reboot key entered corresponds to the valid reboot key, further comprising program code for rebooting the server.

15. The system of claim 14 wherein program code for generating a valid reboot key comprises:
program code for generating a reboot key by the server;
program code for encrypting the server-generated reboot key;
program code for providing the encrypted server-generated reboot key to an authorized person; and
wherein authenticating the reboot key comprises:
responsive to the authorized person entering the encrypted server-generated reboot key at the server, program code for decrypting the encrypted server-generated reboot key;
program code for comparing the decrypted server-generated reboot key to the server-generated reboot key; and
program code for validating the reboot key if the server-generated reboot key and decrypted server-generated reboot key match.

16. The system of claim 14 wherein if rebooting of the server is not authorized by the change record, if the password entered does not correspond to the reboot password, or if the reboot key entered does not correspond to the valid reboot key, further comprising program code for preventing the rebooting of the server.

* * * * *